United States Patent [19]

O'Shaughnessy

[11] 3,897,387

[45] July 29, 1975

[54] FIRE RETARDANT AGENT

[75] Inventor: James D. O'Shaughnessy, Gouverneur, N.Y.

[73] Assignee: James D. O'Shaughnessy, Gouverneur, N.Y.

[22] Filed: May 23, 1973

[21] Appl. No.: 363,212

[52] U.S. Cl......... 260/45.7 R; 106/15 FP; 106/190; 106/210; 117/137; 161/403; 162/159; 252/8.1; 260/2.5 BB; 260/28; 260/28.5 A; 260/28.5 B; 260/29.7 UR; 260/814; 260/DIG. 24
[51] Int. Cl............................................. C08c 11/04
[58] Field of Search... 260/29.7 UA, DIG. 24, 45.7 R, 260/28.5 A, 28.5 B, 28, 814, 2.5 BB; 117/137; 161/403; 252/8.1; 106/15 FP, 190, 106/210; 162/159

[56] References Cited
UNITED STATES PATENTS

| | | | |
|---|---|---|---|
| 1,860,134 | 5/1932 | Brown | 162/159 |
| 2,178,625 | 11/1939 | Clayton et al. | 117/137 |
| 2,648,615 | 8/1953 | O'Brien, Jr. | 117/71 |
| 3,093,599 | 6/1963 | Mueller-Tamm | 260/2.5 |
| 3,158,588 | 11/1964 | Johnson | 260/45.75 |
| 3,202,570 | 8/1965 | Videen | 162/159 |
| 3,385,819 | 5/1968 | Gouinlock, Jr. | 260/45.75 |
| 3,470,116 | 9/1969 | Praetzel et al. | 260/2.5 |
| 3,487,040 | 12/1969 | Jolles | 260/37 |
| 3,689,355 | 9/1972 | Hornbaker et al. | 161/92 |
| 3,770,577 | 11/1973 | Humphrey | 162/159 |

OTHER PUBLICATIONS

Kirk et al., "Encyclopedia of Chemical Technology," Vol. 3, 1964, pages 649 and 650.

Primary Examiner—Melvyn I. Marquis
Attorney, Agent, or Firm—Burgess, Dinklage & Sprung

[57] ABSTRACT

A fire retardant agent comprising calcium or magnesium mineral borates or calcium or magnesium meta borate and a halogen source; a method of rendering organic materials generally of a hydrocarbon nature, such as plastic and rubber polymers, cellulosics, resins and oils, etc., fire retardant by introducing into said organic materials calcium or magnesium mineral borates or calcium or magnesium meta borate and a halide; articles, laminates, coatings, foams, papers, fabrics, etc. containing calcium or magnesium mineral borates or calcium or magnesium meta borate and a halide of atomic weight greater than 19.

17 Claims, No Drawings 3,897,387

FIRE RETARDANT AGENT

BACKGROUND OF THE INVENTION

1. Field of the Invention

This invention is directed to the use of certain specific types of mineral borates, especially calcium or magnesium mineral borates of a generally water-insoluble nature, as flame retardants for organic materials, which borates are employed in a composition containing a source of a halogen of an atomic weight greater than 19. This invention is also directed to imparting to latex foam substances, such as those substances used in carpet backing, increased flame-retardancy by including in the latex foam a water-insoluble mineral borate, such as colemanite or other calcium or magnesium mineral borate. The latex foam contains a source of halide such as chlorine, such as provided by polyvinyl chloride, or a chlorinated, brominated, or iodated organic compound.

2. Discussion of the Prior Art

Borates including some of the mineral borates have been used as fire retardant agents in the past, such as in extinguishing forest fires. Borax and the sodium cation containing materials are generally water-soluble, therefore causing incompatibility problems in some systems.

There is also another major obstacle to their being used in that they are leached out when in contact with a water environment or as in washing or laundering. Hydrated zinc borates are effective fire retardants. However, due to the cost of manufacturing these products, they find application only in specialty products where their high cost is justified. Halogenated materials have also been used as fire retardant agents. Both borates and halogenated materials, when used alone, however, require large amounts of either to be effective.

What has now been discovered is that a composition comprising a relatively crude, inexpensive mineral borate and a halogenated organic material has a synergistic effect in that when only small amounts of each component are employed, significant effective flame retardancy is provided. Such composition, therefore, is an efficient low-cost flame retarding agent.

Numerous fire retardant agents have been proposed for flammable organic materials. Due to current and anticipated Government regulations on items such as carpets there has been an unprecedented desire and demand for effective, economical fire retardants.

SUMMARY OF THE INVENTION

Broadly, this invention contemplates a composition for imparting fire-retardant properties, which composition comprises a calcium or magnesium mineral borate or a calcium magnesium meta borate and a source of a halogen having an atomic weight greater than 19.

In a particularly desirable embodiment, this invention contemplates a method for rendering a flammable material more fire retardant, which method comprises introducing into said organic material a calcium or magnesium mineral borate or a calcium or magnesium meta borate and a source of a halogen of an atomic weight greater than 19.

This invention further contemplates a flame-retarded composition, comprising a calcium or magnesium mineral borate or calcium or magnesium meta borate, a source of a halogen of an atomic weight greater than 19 and a normally flammable organic material.

DESCRIPTION OF SPECIFIC EMBODIMENTS

It has now been found that a synergistic effect with respect to flame-retardency is provided through use of a two-component system. The preferred types of borates include calcium or magnesium meta borate as well as calcium and magnesium mineral borates. Thus there is included within the scope of this invention such mineral borates as the following: $2 CaO.B_2O_3.H_2O$; $CaO.B_2O_3.6H_2O$; $CaO.B_2O_3.4H_2O$; $CaO.B_2O_3.3.65 H_2O$; $2 CaO.3B_2O_3.H_2O$; $2 CaO.3B_2O_3.7H_2O$; $2CaO.3B_2O_3.9 H_2O$; $2 CaO.3 B_2O_3.13H_2O$; $CaO.B_2O_3.2H_2O$; Colemanite ($2 CaO.3B_2O_3.5H_2O$); boracite, sassolite, ulixite, tertschite ($4 CaO.5B_2O_3.20H_2O$); probertite ($Na_2O.2CaO.5B_2O_3.10H_2O$); priceite, pandermite ($4CaO.5B_2O_3.7 H_2O$); inyoite ($2CaO.B_2O_3.13H_2O$ or $2C_aO.3B_2O_3.19H_2O$); meyerhofferite ($2CaO.3B_2O_3.7H_2O$); nobleite ($CaO.3B_2O_3.4H_2O$); goerite ($CaO.3B_2O_3.4H_2O$); natural or synthetic ginorite ($2 CaO.3B_2O_3.8H_2O$); calciborite ($CaO.B_2O_3$); inderborite ($CaO.MgO.3 B_2O_3.11H_2O$); hydroboracite ($CaO.MgO.3B_2O_3.6H_2O$); $K_2O.CaO.4 B_2O_3.12 H_2O$; $(NH_4)_2O.CaO. 4B_2O_3.12 H_2O$; $Na_2O.2 CaO.5B_2O_3.16H_2O$ and $CaO.2B_2O_3.5H_2O$. Most of these are complex polyboron borates which contain recurring borate units in the mineral. They are unlike the materials such as borax in that they are not readily soluble in water and that, curiously, unless they are used in large quantities, they have a small effect on an organic material with respect to flame retardancy without the presence of a source of halogen of an atomic weight of at least 19. Generally speaking, these materials are insoluble to only slightly soluble in water at 25°C. and are much less soluble than their sodium counterparts.

The magnesium borates useful in the invention include magnesium metaborate ($Mg (BO_2)_2.3H_2O$), also known as pinnoite, magnesium metaborate ($Mg(BO_2)_2.8H_2O$), $Mg_2 B_2O_5.H_2O$, also known as ascharite; szaibelyite ($2MgO.B_2O_3.H_2O$ or $2 MgO.B_2O_3.3H_2O$); pinnoite ($KgO.B_2O_3.3H_2O$); inderite and kurnakovite each having the formula $2MgO.3B_2O_3.15H_2O$; preobrazlienskite ($3MgO.5B_2O_3.4.5H_2O$; $MgO.2B_2O_3.8.5H_2O$; $MgO.3B_2O_3.7.5H_2O$; $MgO.3B_2O_3.5H_2O$; magnesium pyroborate ($MgO.B_2O_3$); suanite ($2MgO.2B_2O_3$); $3 MgO.B_2O_3$); $(NH_4)_3O MgO.3B_2O_3.15H_2O$ and $7H_2O$.

The materials above similarly have low water-solubilities at 25°C.

Moreover, it must be understood that the incorporation of the halide is critical to the synergism whereby significantly greater flame-retardant properties are obtained.

Halides which are particularly useful in the compositions of the present invention and in the methods of improving flame retardancy are those chlorinated, brominated, iodated, or mixed halogenated compounds of aliphatic or aryl compositions such as paraffins, fatty acids, starches, sugars, cellulosics, resins, polymers, rubbers, phenolics and heterocyclics.

Included within this group are: polyvinyl chloride, chlorinated polyethylene, halogenated paraffins where the alkyl group contains between 6 and 36 carbon atoms in the chain, preferably between 12 and 24 carbon atoms in the chain. The halides contemplated within the invention include, specifically, chlorine, bromine and iodine. Additional sources of halogen include halogenated aromatic compounds, especially with aryl groups, such as $C_6$—$C_{18}$. Included within this group are phenyl naphthyl and anthracyl compounds. Of these, halogenated phenyl compounds are desired. The phenyl compound can be a polyhalogenated compound which supplies one or more halide atoms to the composition. Indeed, the phenyl compound can supply several types of halides such as would be supplied by 2 bromo, 1,3 dichlorobenzene. It will be realized that the aryl group, especially the phenyl group, can be substituted to any desired extent provided there exists an available halide. Thus the same can have other substitutes on the ring, such as amino, imino, alkoxy, nitrile, nitroso, sulfono, alkyl, especially $C_1$—$C_8$, acetyl and the like, including ortho, para and meta directors.

Other halogenated organic compounds useful include:

Halogenated acids where the halogen is an anioncarbonyl atom especially $C_3$—$C_{24}$ saturated and unsaturated fatty acids;

Polyethers such as polyethylene glycol derivatives;

Ketones where at least one substituent attached to the carbonyl has at least 4 carbon atoms, preferably 4 to 12;

Aldehydes where the substituent attached to the carbonyl group is at least 4 carbon atoms, especially $C_4$ to $C_{12}$;

Anhydrides of the halogenated acids;

Alcohols, both primary and secondary, which are the reduction products of the aldehydes or ketones set forth above, i.e., having 4 to 12 carbon atoms or a group attached to the carbon atom bearing the OH radical;

Acid halides, especially $C_2$ to $C_{10}$ acid halides;

Saccharides, especially mono- di- and polysaccharides, including starch and cellulose.

There are also contemplated derivatives of the above, such as the esters of the acids and the thio derivatives of the acids, aldehydes, ketones and alcohols set forth above.

Additionally, the following aryl compounds in halogenated form can be employed:

Aryl compounds having $C_6$ to $C_{18}$ aryl radicals, especially phenyl. These can be substituted as follows or can be unsubstituted (aside from the halogen): Substitutes include Ether especially where the organic group attached to the oxygen contains at least 4 carbon stoms;

Aldehyde, especially where the organic radicals attached to the oxygen atom contains at least 4 carbon atoms, e.g., $C_4$—$C_{12}$;

Ketone, especially where at least one organic group attached to the oxygen atom has at least 4 carbon atoms, e.g., $C_4$—$C_{12}$;

Alkenyl, especially $C_4$—$C_{12}$;

Alcohol, especially $C_4$—$C_{12}$, whether primary or secondary;

Hydroxy, e.g., 1 hydroxy 2 chloro phenyl;

Sulfonate

Nitrate

Acid radical, especially $C_2$—$C_{10}$ acid halide

Cyano

Mercapto

Amine

Dicarboxylic acid and its anhydride, especially phthalic acid anhydride.

Other agents hexachloro and hexabromo benzene. Especially contemplated are materials which are at least 50% halogenated by weight. Decabromodiphenyl oxide [Dow FR-300-BA] a new fire retardant agent. Especially included is hexachlorocyclopentadiene and chloroprene.

Additionally, the following can be employed:

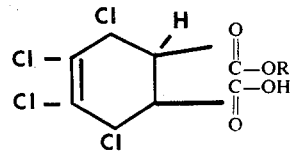

its acids, mixed acids, bi-acids, mixed esters, biesters and anhydrides.

In the formula R can be H, $C_1$—$C_{12}$ alkyl or a halogenated derivative thereof.

Examples of particularly suitable highly chlorinated materials useful in the present invention include:

1,2,3,4-tetrachloro-5,5-dimethoxycyclopentadiene
1,2,3,4-tetrachlorocyclopentadiene
nonachlorobicyclo[3.2.0] heptene-2
1,2-dichloro-3,3,4,4,5,5-hexafluorocyclopentene
decachloropentacyclo[$5.3.0.0^{2,6}.0^{4,10}.0^{5,9}$]decan-3-one
octachlorocyclopentene
bis(pentachloro-2,4-cyclopentadien-1-yl)
1,2,3,3,5,5-hexachloro-4-(dichloromethylene)-cyclopentene
perchloropentacyclo[$5.2.1.0^{2,6}.0^{3,9}.0^{5,8}$]-decane
2,3,4,4,5-pentachloro-2-cyclopentene-1-one
1,2,4-trichlorocyclopentene-3,5-dione
1,2,3,4,7,7-hexachlorobicyclo[2.2.1]-2.5 heptadiene
1,4,5,6,7,7-hexachlorobicyclo[2.2.1]-5-heptene-2,3-dicarboxylic acid
1,4,5,6,7,7-hexachloro-2,3-bis(chloromethyl)-bicyclo [2,2,1]-5-heptene
1,4,5,6,7,7-hexachloro-2-(1,2-dichloroethyl)-bicyclo [2.2.1]-5-heptene
1,4,5,6,7,7-hexachloro-2-carboxy-bicyclo[2.2.1]-5-heptene
1,4,5,6,7,7-hexachloro-2,3-bis(hydroxymethyl)-bicyclo [2.2.1]-5-heptene
undecachloropentacyclo[$5.3.0^{2,6}.0^{4,10}.0^{5,9}$]-3-decyclorosulfonate
4,5,6,7,8,8-hexachloro-3a, 7a-dihydro-4,7-methanoindene
1,2,3,4,10,10-hexachloro-1,4,4a, 5,8,8a-hexahydro-1,4-endo, exo-5,8-dimethanonaphthalene
1,4,5,6,7,7-hexachloro-2-formylbicyclo[2.2.1]-5-heptene
1,4,5,6,7,7-hexachloro-2-cyanobicyclo[2.2.1]-5-heptene hexachlorocyclopentenones Halogenated heterocyclics, especially those containing between 5 and 8 members in the ring and containing, as a component of the ring, a nitrogen, sulfur or oxygen atom, can be suitably employed. Contemplated within these definitions are included materials such as furan, pyridine and other nitrogen-containing heterocyclics such as pyrimidine.

The synergistic composition of the present invention is useful in a wide variety of flammable materials. Generally speaking, the composition is useful in all organic materials which are flammable. Most polymeric and resinous compositions are organic and are therefore flammable.

The resinous compositions can be of any resin, including polymers of alpha olefins, especially polyethylene, polypropylene, polybutene-1, polyisobutylene, vinyl polymers, including polymers of vinyl chloride, methyl methacrylate, ethyl methacrylate, acrylonitrile, vinyl alcohol, vinyl acetate, vinyl butyral and styrene, polyamide, especially nylon 6 and nylon 6/6, polyacetals, polyurethanes, polyesters; also polymers classified as rubbers or latexes such as natural rubber, polystyrene-butadiene-acrylonitrile; acrylic, chlorosulfonated polyethylenes, epichlorohydrin, ethylene-propylene copolymers, ethylene-propylene-diene terpolymers, polyisoprene-acrylonitrile, polybutadienes, polychloroprenes, polyisoprenes, polystyrene-isoprene, and polyurethanes.

There are also included condensation polymers such as phenol-formaldehyde and urea-formaldehyde polymers, polycarbonates and, for that matter, all organic thermoplastic and thermosetting resins and polymers such as epoxy resins.

A particular use of the composition of the present invention is in the field of latex foams. Thus, it has been discovered a styrene-butadiene rubber latex foam can be rendered flame-retardant by removing a portion of the SBR latex and substituting for such portion a polyvinyl chloride latex material. Such material not only is compatible with the SBR latex to accomplish the purposes for which the latex is used, but also the polyvinyl chloride contributes the desired source of halogen, so that no additional halide need be added to the composition. The composition is complete when it contains the added calcium or magnesium mineral borate. Latex foams which contain, initially, an adequate amount of chlorine, bromine, or iodine need not have added thereto a material which acts as a source of halogen, it being sufficient that the mineral borate be added thereto. Other latex materials which can be treated include natural rubber, acrylic, isoprene, acrylonitrile, nitrile, polybutadiene, polyisobutylene, polyisoprene, vinyl pyridine, especially when they contain a source of halogen of atomic weight of at least 19.

Other organic materials which can be rendered more flame-retardant include fibrous materials such as cotton, polyester, nylon, acrylics, non-woven and woven fabrics of natural and synthetic fibers, paper, Kraft cardboards, adhesives, molded plastics, compressed paper employed in the building industry in lieu of plywood sheathing, and egg cartons.

The amount of mineral and source of halogen will vary depending upon the type of mineral and the type of halogen source employed. Generally speaking, the mineral will be present in the material to be protected in an amount between 2 and 400 phm (parts per hundred of organic material, e.g., resin) preferably in an amount between 5 and 50 phm. The parts are on a weight basis. Similarly, the source of halogen will be present, such that the halogen itself is present in an amount between 1 and 100 phm, preferably between 2 and 20 phm, based upon the weight of the resin being rendered flame-retardant. The relation of mineral borate and halogen generally satisfy the following ratios: 1 to 8 parts by weight mineral borate; 1 part by weight halogen. Preferably the ratio is 1 to 4:1. Naturally, these ratios are satisfied in different manners by different materials, owing to their different polymer systems, the purity of the borate ore, and the atomic weight and effectiveness of the different halogens and the number of halogen atoms on the compound supplying the same.

It has been found, surprisingly, that mined mineral borates having a relatively high concentrate of non-borate materials can be used as such, i.e., in a non-refined state, pursuant to the present invention. The concentration of borates are normally reported as to their percentage of boric oxide ($B_2O_3$). Thus it has been found that the borate can be present together with other minerals in an amount between 15 and 55 percent by weight, based upon the weight of the boric oxide. For example, gangue materials which can be present together with the borate include earth (soil), bentonite clay, and other normally associated mineral silicates and carbonates.

However, in certain instances, it is preferred that the mined mineral borate be refined, so that it has a purity of at least 45 percent $B_2O_3$. Different mineral types and grades to be employed are dependent on such factors as type of borate ore, mine location, purity and assay of ore, as well as other processing refinements.

In order to more fully illustrate the nature of the invention and the manner of practising the same, the following examples are presented:

EXAMPLE I

| FORMULA: | FIRE RETARDANT NO GEL LATEX FOAM | A | B |
|---|---|---|---|
| IA | (Pliolite LPE3717E (5) (NO GEL SBR latex) | 129.0 | 129.0 |
| | (Geon 354 (2) (polyvinyl chloride latex) | 19.0 | 19.0 |
| | (Sipex OLS (6) (alkyl sulfonate) (a wetting agent) | 3.75 | 3.75 |
| | (Sodium tripolyphosphate | 4.0 | 4.0 |
| | (NH₄OH | 5.0 | 5.0 |
| IB | (Acrysol GS (3) (polyacrylamide thickener) | 3 drops | 3 drops |
| | (Sparta fil (7) (Feldspar) | 200.0 | 160.0 |
| II | (Colemanite = calcium borate of formula 2 CaO.B₂O₃.5H₂O | — | 40.0 |
| III | (Cure Paste-(sulfur & rubber accelerators) | 10.0 | 10.0 |
| | | 370.75 | 370.75 |

NO GEL LATEX FOAM PROCEDURE

Mixed slowly part IA until thoroughly blended. Added part IB, thickener, to desired viscosity. Added Part II, fillers, flame retarders, and pigments with intermediate stirring until dispersed. Added Part III, with stirring. Foamed with 6 minutes at high speed on blender, poured out onto substrate and drawn down to desired thickness, generally three eighths inches thick. Cured 20 min. at 150° C.

FIRE RETARDANT TEST - HORIZONTAL MATCH TEST

Foam samples of the above materials, 1 inch × 5 inches × 3/8 inch, were supported horizontally and a burning match was positioned under the leading edge of the foam samples for 5 seconds.

Failure to self-extinguish within 1 inch of the edge is considered failing.

TEST RESULTS:

The A samples had to be extinguished after burning for more than 1 inch and therefore failed.

The B samples self-extinguished in less than 1 inch and therefore passed.

PROCEDURE FOR LATEX FOAM

Part I was stirred slowly as Part II was added and mixed in. Part III was then added gradually, and foamed for 2½ minutes at high speed.

Part IV is added and mixed one minute, then Part V is added and mixed for 40 seconds.

The foam is poured onto the substrate, drawn down, gelled for 30 seconds under heat lamps, and then cured for 20 min. at 150° C.

TEST AND RESULTS:

Samples from A, B, and C were exposed to the 5 second horizontal match test.

Sample A (Colemanite and PVC) Passed Sample B (Colemanite, $Sb_2O_3$ and PVC) Passed Sample C ($Sb_2O_3$ and PVC) Failed

EXAMPLE III

FLAME RETARDANT PLASTISOL

| FORMULA: | | A | B |
|---|---|---|---|
| I. | (Dioctyl phthalate | 350 | 350 |
| | (Paraplex G62 (3) epoxy plasticizer) | 25 | 25 |
| | (Nuostabe VI216 (4) (Ba & Cd fatty acid stabilizer) | 15 | 15 |
| | (Alcolec S -(Sulfonated wetting agent) | 5 | 5 |
| | (Gerstly Borate (1) (Ulexite & Colemanite) | — | 75 |
| II. | (Atomite (22) (Calcium Carbonate) | 75 | — |
| III. | (Geon 121 (2) (Polyvinyl chloride dispersion grade) | 500 | 500 |
| IV. | (30% CaO paste | 5 | 5 |
| | | 975 grams | 975 grams |

PLASTISOL PROCEDURE

Part II was added to Part I and dispersed with a Cowles Dissolver. Part III was then added and dispersed followed by Part IV. The plastisol was evacuated, drawn down, and fused.

EXAMPLE II

FIRE RETARDANT TYPE LATEX FOAM

| | | A | B | C |
|---|---|---|---|---|
| | (Pliolite 5352D (5) (SBR Latex) | 119.0 | 119.0 | 119.0 |
| | (Geon 354 (2) (PVC copolymer) | 27.0 | 27.0 | 27.0 |
| | (PTPP (potassium tripolyphosphate) | 2.0 | 2.0 | 2.0 |
| | (Alipal CD436 (8) (Wetting agent) | 2.0 | 2.0 | 2.0 |
| | (50% $K_2CO_3$ | 2.0 | 2.00 | 2.00 |
| | (10% KOH | 4.0 | 4.0 | 4.0 |
| II | (Cure Paste (sulfur & rubber accelerators) | 20.5 | 20.5 | 20.5 |
| | (20% Potassium oleate | 20.0 | 20.0 | 20.0 |
| | (Water to Balance | 2.0 | 2.0 | 2.0 |
| | (Spartafil (7) (Feldspar) | 160.0 | 179.0 | 197.0 |
| III | (Colemanite | 40.0 | 20.0 | — |
| | (Thermogard S ($Sb_2O_3$) (21) | — | 1.0 | 3.0 |
| | ($NH_4OH$ | 2.0 | 2.0 | 2.0 |
| | (Arquad T-50 (9) (Quaternary Ammonium Compound) | 3.0 | 3.0 | 3.0 |
| IV | (Water | 4.0 | 4.0 | 4.0 |
| | (20% Potassium Oleate | (3 drops) | (3 drops) | (3 drops) |
| V | (25% Ammonium Acetate | 10.0 | 10.0 | 10.0 |
| | | 416.5 | 416.5 | 416.5 |

TEST AND RESULTS:

Film samples of the above materials 0.5 inches wide and 0.14 inches thick, were supported horizontally and a burning match was positioned under the leading edge of the plastisol samples for 5 seconds. Upon removal of the flame, the B samples self-extinguished within 8 seconds, and burned less than 1/16 inch, passing the test. The A samples burned over 1 inch (completely) and were considered to have failed.

EXAMPLE IV

FLAME RETARDANT POLYESTER

FORMULAS:

|  | A | B |
| --- | --- | --- |
| Polylite 31-586 (polyester resin) (22) | 34.1 | 34.1 |
| Dion FR6399 (chlorinated polyester resin (14) | 5.0 | 5.0 |
| BPO Paste (Benzoyl peroxide) (22) | 0.9 | 0.9 |
| 80 WSA (Talc) (16) | 60.0 | 35.0 |
| Colemanite | — | 25.0 |
|  | 100.0 | 100.0 |

PROCEDURE:

The materials were mixed, molded into one quarter inch rods, cured for 15 min. at 300° F.

The samples were exposed to a modified match test. The samples were positioned at 45° down from the horizontal to increase the severity of the flame test. Otherwise the match was again held at the leading edge of the sample for 20 seconds.

The sample passes if it self-extinguishes before burning 1 inch.

RESULTS:

Formula A failed the match test. Formula B passed.

EXAMPLE V

Flame Retardance and Prevention of Dripping of Polypropylene

Polyolefins are very flammable due to their wax like structure. Also, when they are ignited they melt and run or drip, thereby carrying and spreading the flame.

It is therefore advantageous that where flame retardance is necessary that the resin also be prevented from running and spreading the flames.

The following compositions were tested:

|  | A | B | C | D |
| --- | --- | --- | --- | --- |
| Profax 6523 (24) (POLYPROPYLENE RESIN) | 100 g | 100 g | 100 g | 100 g |
| CITEX BC 26 (20) (Organic-Chemical containing Cl and Br) | — | 3 g | 3 g | 6 g |
| COLEMANITE | — | — | 40 g | — |
| 80 WSA TALC (16) | — | — | — | 40 g |
|  | 100 g | 103 g | 143 g | 146 g |

PROCEDURE

The extruded samples were cut into strips, held in a vertical position and the top edge was ignited by holding a match to it for 20 seconds. Failure results from not self-extinguishing within an inch.

RESULTS:
  Sample A failed and ran.
  Sample B failed and ran.
  Sample C passed and no running.
  Sample D failed and ran.
CONCLUSIONS:

The addition of the Citex at this level was not sufficient to make the polypropylene flame retardant and non-dripping. The addition of the Colemanite effected both desired results. The addition of the inert talc effected neither of the desired results when added with double the amount of Citex, which is an organic chemical containing both aliphatic bromine and chlorine.

EXAMPLE VI

Flame Retardant Paper

Brown Kraft paper was made flame retardant and self-extinguishing by the addition of Colemanite and vinyl chloride-vinylidene chloride copolymer, whereas the paper containing double the amount of either material alone remains flammable.

PROCEDURE FOR SAMPLE PREPARATION:

3 grams of brown kraft paper was refiberized with 450 cc of water in a Waring Blender. Two coats of the paper was then reformed on a screen, press dried on felt and finally dried in an oven for 30 min. at 100° C and stored in a dessicator until testing for flame resistance. Three other papers were made by adding the following per coat:

| MATERIALS | CONTROL | A | B | C |
| --- | --- | --- | --- | --- |
| Kraft Paper | 3 g | 3 g | 3 g | 3 g |
| Colemanite | — | 2.4 g | 1.2 g | — |
| Geon 652 (2) (x) | — | — | 2.4 g | 4.8 g |

(x)=(vinyl chloride-vinylidene chloride copolymer)

TEST PROCEDURE:

The dry paper sample materials are cut into 1 inch wide strips. These strips are suspended horizontally in a draft free hood and the leading edge of each strip when tested is ignited with a burning match. The material passes if the sample self-extinguishes within an inch of the ignited edge. The material fails if it's samples do not extinguish themselves within this limit.

RESULTS:

| SAMPLE | Variable | Fire Test |
| --- | --- | --- |
| Control | Paper Only | Failed |
| A | Double Colemanite | Failed |
| B | Colemanite & Copolymer | Passed |
| C | Double Copolymer | Failed |

CONCLUSIONS:

The Colemanite with the halogenated polymer is effective as a fire retarder in Kraft paper. The combina-

EXAMPLE VII

Flame Retardance of Polystyrene

The following materials were heated, blended, molded, and cooled. They were then exposed to the 20 second horizontal match test.

|  | A | B |
|---|---|---|
| Piccolastic D 150 (10)(Polystyrene Resin) | 100 | 100 |
| Hexabromobenzene (11) | 1 | 1 |
| Colemanite | — | 10 |
|  | 101 | 111 |
| Match test results: | Failed | Passed |

EXAMPLE VIII

Flame Retardance of Rubber

The following formulas were made by combining their ingredients on a 2-roll rubber mill, calendaring and curing in a mold for 20 min. at 300° F. The cured rubber specimens were cut into 1 inch × 6 inch × 1/8 inch samples and were exposed to flame tests.

| | FORMULAS | |
|---|---|---|
| | A | B |
| | Chlorowax 70 20 phm | Chlorowax 70 20 phm Colemanite 60 phm |
| MATERIALS | | |
| Natural Rubber (N.R.) | 30 | 30 |
| Plioflex 1502 (SBR) (5) | 30 | 30 |
| Epsyn 40 (EPDM) (12) | 20 | 20 |
| Chlorobutyl 10-68 (IIR) (13) | 20 | 20 |
| Chlorowax 70 (14)(Chlorinated Paraffin) | 20 | 20 |
| Protox 166 (ZnO) (15) | 5 | 5 |
| Colemanite | — | 60 |
| P-725 Talc (16) | 40 | — |
| TiPure LW (TiO$_2$) (17) | 35 | 15 |
| Sulfur Tire RM (18) | 2.65 | 2.65 |
| MBTS (17)(Benzothiazyl disulfide) | 0.75 | 0.75 |
| Vultax No. 5 (19)(Curing Agent) | 1.25 | 1.25 |
| | 204.65 | 204.65 |

The flame test consisted of laying the samples flat horizontally and lighting the leading edge of the sample with a match held to the sample for 20 seconds. The sample is judged to pass if it self-extinguishes within one inch of the edge.

RESULTS:

Formula A consistantly failed the flame test, whereas Formula B passed.

RAW MATERIAL SUPPLIERS

1. U. S. Borax & Chemical Corp.
2. B. F. Goodrich Chemical Co.
3. Rohm and Haas Co.
4. Tenneco Chemicals Inc.
5. Goodyear Co.
6. Alcolac Chemical Corp.
7. Spartan Minerals Co.
8. GAF
9. Armak Company
10. Pennsylvania Industrial Chemical Corp.
11. East Coast Chemicals Inc.
12. Copolymer Rubber and Chemical Corp.
13. Enjay Chemical Co.
14. Diamond Shamrock Chemical Co.
15. New Jersey Zinc Co.
16. International Talc Co., Inc.
17. E. I. du Pont de Nemours and Co.
18. Stauffer Chemical Co.
19. Pennsalt Chemicals Corp.
20. Cities Service Co.
21. M and T Chemicals, Inc.
22. Reichhold Chemicals Inc.
23. Thompson, Weinman and Co.
24. Hercules Inc.

What is claimed is:

1. A fire retardant agent comprising a calcium or magnesium mineral borate or a calcium or magnesium metaborate and a halogen source, said halogen having an atomic weight greater than 19.

2. A composition according to claim 1 wherein the calcium or magnesium mineral borate is selected from the group consisting of $2CaO.B_2O_3.H_2O$; $CaO.B_2O_3.6H_2O$; $CaO.B_2O_3.4H_2O$; $CaO.B_2O_3.3.65 H_2O$; $2CaO.3B_2O_3.H_2O$; $2CaO.3B_2O_3.13 H_2O$; $2CaO.3B_2O_3.9 H_2O$; $2CaO.3B_2O_3.7H_2O$; $CaO.B_2O_3.2H_2O$; Colemanite, Boracite, Sassolite, Ulexite, Tertschite, Probertite, Priceite, Pandermite, Inyoite, Meyerhofferite, Nobleite, Gowerite, Ginorite, Calciborite, Inderborite, Hydroborocite, $K_2O.CaO.4B_2O_3.12H_2O$; $(NH_4)_2.CaO.4B_2O_3.12H_2O$; $Na_2O.2CaO.5B_2O_3.16H_2O$; Pinnoite, Ascherite, Szaibelyite, Inderite, Kurnakovite, Preobrazlienskite, $M_gO.2B_2O_3.8.5H_2O$; $MgO.3B_2O_3.7.5H_2O$; $MgO.3 B_2O_3.5H_2O$; Suanite, $(NH_4)_2O.MgO.3B_2O_3.15H_2O$ and $(NH_4)_2O.MgO.3B_2O_3.7H_2O$.

3. A composition according to claim 2 wherein the calcium or magnesium borate preferably has a negligable solubility in water at 25°C.

4. A composition according to claim 2 wherein the halogen source is selected from the group consisting of halogen-containing polymers, halogen-containing rubbers, halogen-containing phenolics, halogenated aliphatic compounds and halogenated aromatic compounds.

5. A composition according to claim 4 wherein the halogen source is selected from the group consisting of halogenated acids where the halogen is on a non-carbonyl atom, said acid having between 3 and 24 carbon atoms and being saturated or unsaturated, polyethers, ketones where at least one substituent attached to the carbonyl has between 4 and 12 carbon atoms, aldehydes where the substituent attached to the carbonyl group has between 4 and 12 carbon atoms, anhydrides of halogenated acids where the halogen is on a non-carbonyl atom and the group attached to the carbonyl atom has between 3 and 24 carbon atoms, primary alcohols in which the group attached to the OH radical has between 4 and 12 carbon atoms, secondary alcohols in which at least one group attached to the carbon atom to which the OH radical is attached has between 4 and 12 carbon atoms, acid halides of $C_2$ to $C_{12}$ atoms, monosaccharides, polysaccharides, starch, cellulose, esters of said acids, thio derivatives of said acids, aldehydes, ketones and alcohols where the sulfur atom replaces the oxygen atom, aryl compounds of $C_6$ to $C_{18}$ carbon atoms, aryl ethers where the organic group attached to the oxygen contains at least 4 carbon atoms, aryl aldehydes where the organic radical attached to the oxygen atom contains between 4 and 12 carbon atoms, arylketones where at one organic group attached to the oxygen atom has between 4 and 12 carbon atoms, alkenyl aryl compounds where the alkenyl group contains between 4 and 12 carbon atoms, aryl alcohols where at least one organic radical attached to the carbon bearing the hydroxy group has between 4 and 12 carbon atoms, hydroxy aryl compounds, sulfonated aryl compounds, nitrated aryl compounds, aryl acid halides of $C_2$ to $C_{12}$ atoms in the acid halide group, cyano aryl compounds, mercapto aryl compounds, amine aryl compounds, aromatic dicarboxylicacids and their anhydrides, cyclic and heterocyclic organic chemicals having between 5 and 10 members in the ring.

6. A composition according to claim 2 wherein said halogen source is selected from the group consisting of a compound having the formula

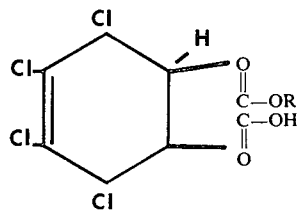

its acids, mixed acids, bi-acids, mixed esters, bi-esters and anhydrides, wherein R can be H, $C_1$—$C_{12}$ alkyl or a halogenated derivative thereof, 1,2,3,4-tetrachloro-5,5-dimethoxycyclopentadiene, 1,2,3,4,-tetrachlorocyclopentadiene, nonachlorobicyclo [3.2.0] heptene-2, 1,2-dichloro-3,3,4,4,5,5-hexafluorocyclopentene, decachloropentacyclo [$5.3.0.0^{2,6}.0^{4,10}.0^{5,9}$] decan-3-one, octachlorocyclopentene, bis(pentachloro-2,4-cyclopentadiene-1-yl), 1,2,3,3,5,5hexachloro-4-(dichloromethylene)-cyclopentene, perchloropentacyclo [$5.2.1.0^{2,6}.0^{3,9}.0^{5,8}$]-decane, 2,3,4,4,5-pentachloro-2-cyclopentene-1-one, 1,2,4-trichlorocyclopentene-3,5-dione, 1,2,3,4,7-hexachlorobicyclo [2.2.1]-2,5-heptadiene, 1,4,5,6,7,7-hexachlorobicyclo [2.2.1]-5-heptene-2,3-dicarboxylic acid, 1,4,5,6,7,7-hexachloro-2,3-bis(chloromethyl)-bicyclo [2.2.1]-5-heptene, 1,4,-5,6,7,7-hexachloro-2-(1,2-dichloroethyl)-bicyclo [2.2.1.]-5-heptene, 1,4,5,6,7,7-hexachloro-2-carboxybicyclo [2.2.1]-5-heptene, 1,4,5,6,7,7-hexachloro-2,3-bis(hydroxymethyl)-bicyclo [2.2.1.]-5-heptene, undecachloropentacyclo [$5.3.0^{2,6}.0^{4,10}.0^{5,9}$]-3-decyclorosulfonate, 4,5,6,7,8,8-hexachloro-3a, 7a-dihydro-4,7-methano-indene, 1,2,3,4,10,10-hexachloro-1,4,4a, 5,8,8a-hexahydro-1,4,-endo, exo-5,8-dimethanonaphthalene, 1,4,5,6,7,7-hexachloro-2-formylbicyclo[2.2.1]-5-heptene, 1,4,5,6-,7,7-hexachloro-2-cyanobicyclo[2.2.1]-5-heptene, and hexachlorocyclopentenones.

7. A composition according to claim 4 wherein the mineral is present together with the halogen such that the weight ratio of mineral borate to halogen is between 1 and 8.

8. A composition according to claim 7 wherein said ratio is between 1 and 4.

9. A composition comprising a normally flammable organic material and the fire-retardant composition of claim 2.

10. A flame-stabilized composition comprising a normally flammable organic material and the fire retardant composition of claim 5.

11. A flame-stabilized composition comprising a normally flammable organic material and the flame retardant composition of claim 6.

12. A flame stabilized composition comprising a normally flammable organic material and the flame retardant composition of claim 6, the weight ratio of mineral to halogen source being between 1 and 8 and the mineral being present in the composition in an amount between 2 and 400 parts per part of organic material.

13. A flame stabilized composition according to claim 12 wherein the amount of mineral introduced is between 5 and 50 parts per 100 parts of organic material and the weight ratio of mineral to halogen is between 1 and 4.

14. A flame stabilized composition according to claim 13 wherein the organic material is selected from the group consisting of polymers of alpha olefins, vinyl polymers, polyamides, polyacetals, polyurethanes, polyesters, rubbers and latexes.

15. A flame stabilized composition according to claim 14 wherein said organic material is a polymer of an alpha olefin.

16. A flame stabilized composition according to claim 15 wherein said organic material is a polypropylene.

17. A flame stabilized composition comprising a normally flammable organic material selected from the group consisting of polyethylene, polypropylene, polybutene-1, polyisobutylene, polyvinyl chloride, polymethylmethacrylate, polyethylmethacrylate, polyacrylonitrile, polyvinylalcohol, polyvinylacetate, polyvinylbutyral, polystyrene, nylon 6, nylon 6/6, natural and synthetic rubbers, natural and synthetic latexes, polystyrene-butadiene, polyacrylonitrile acrylic polyethylenes, chlorosulfonated polyethylenes, epichlorohydrin and its polymers, ethylene-propylene copolymers, ethylene-propylene-diene terpolymers, polyisoprene-acrylonitrile, polybutadiene, polychloroprenes, polyisoprenes, polystyrene-isoprene and polyurethane, said composition containing a flame retardant composition which comprises a calcium or magnesium mineral borate and a source of a halide of atomic weight greater than 19, said source of halide being selected from the group consisting of a compound having the formula

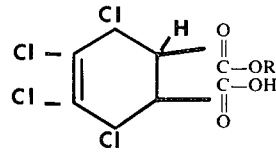

its acids, mixed acids, bi-acids, mixed esters, bi-esters and anhydrides, wherein R can be H, $C_1$—$C_{12}$ alkyl or a halogenated derivative thereof, 1,2,3,4-tetrachloro-5,5-dimethoxycyclopentadiene, 1,2,3,4-tetrachlorocyclopentadiene, nonachlorobicyclo [3.2.0] heptene-2, 1,2,-dichloro-3,3,4,4,5,5-hexafluorocyclopentene, decachloropentacyclo [$5.3.0.0^{2,6}.0^{4,10}.0^{5,9}$]decan-3-one, octachlorocyclopentene, bis(pentachloro-2,4-cyclopentadiene-1-yl), 1,2,3,3,5,5-hexachloro-4-(dichloromethylene)-cyclopentene, 1,4,5,6,7,7 perchloropentacyclo [$5.2.1.0^{2,6}.0^{3,9}.0^{5,8}$]-decane, 2,3,4,4,-5-pentachloro-2-cyclopentene-1-one, 1,2,4-trichlorocyclopentene-3,5-dione, 1,2,3,4,7-hexachlorobicyclo [2.2.1]-2,5-heptadiene, 1,4,5,6,7,7-hexachlorobicyclo [2.2.1]-5-heptene-2,3-dicarboxylic acid, 1,4,5,6,7,7-hexachloro-2,3-bis(chloromethyl)-bicyclo [2.2.1]-5-heptene, 1,4,5,6,7,7-hexachloro-2-(1,2-dichloroethyl)-bicyclo [2.2.1]-5-heptene, 1,4,5,6,7,7-hexachloro-2-carboxybicyclo [2.2.1]-5-heptene, 1,4,5,6,7,7-hexachloro-2,3-bis(hydroxymethyl)-bicyclo [2.2.1]-5-heptene, undecachloropentacyclo [$5.3.0^{2,6}.0^{4,10}.0^{5,9}$]-3-decyclorosulfonate, 4,5,6,7,8,8-hexachloro-3a,7a-dihydro-4,7-methano-indene, 1,2,3,4,10,10-hexachloro-1,4,4a,5,8,8a-hexahydro-1,4,-endo, exo-5,8-dimethanonaphthalene, 1,4,5,6,7,7-hexachloro-2-formylbicyclo[2.2.1]-5-heptene, 1,4,5,6,7,7-hexachloro-2-cyanobicyclo[2.2.1]-5-heptene, and hexachlorocyclopentenones.

* * * * *

UNITED STATES PATENT OFFICE
CERTIFICATE OF CORRECTION

PATENT NO. : 3,897,387
DATED : July 29, 1975
INVENTOR(S) : James D. O'Shaughnessy It is certified that error appears in the above-identified patent and that said Letters Patent are hereby corrected as shown below:

Col. 3, line 49

"stoms" should be "atoms"

Col. 7, Example II

In front of and between the first two lines of the first column of the table insert -- I --.

Col. 13, lines 20-25 (claim 6) and Col. 14, lines 45-50 (claim 17)

The formulas should read as follows:

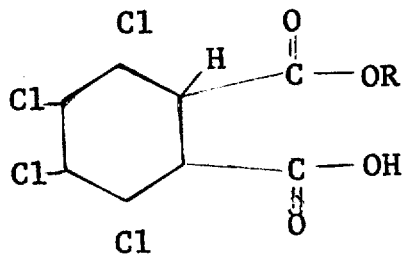

Signed and Sealed this sixth Day of January 1976

[SEAL]

Attest:

RUTH C. MASON
Attesting Officer

C. MARSHALL DANN
Commissioner of Patents and Trademarks